United States Patent
Nakamuta et al.

(10) Patent No.: US 10,459,872 B2
(45) Date of Patent: Oct. 29, 2019

(54) DATA COMMUNICATION APPARATUS

(71) Applicant: Murata Manufacturing Co., Ltd., Kyoto (JP)

(72) Inventors: Kazuhiro Nakamuta, Kyoto (JP); Masanori Iijima, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/180,567

(22) Filed: Nov. 5, 2018

(65) Prior Publication Data

US 2019/0138491 A1    May 9, 2019

(30) Foreign Application Priority Data

Nov. 8, 2017  (JP) .................................. 2017-215646

(51) Int. Cl.
*G06F 13/42*    (2006.01)

(52) U.S. Cl.
CPC .. *G06F 13/4291* (2013.01); *G06F 2213/0016* (2013.01)

(58) Field of Classification Search
None
See application file for complete search history.

(56) References Cited

U.S. PATENT DOCUMENTS

| 2012/0054379 A1* | 3/2012 | Leung ................... G06F 1/3206 710/23 |
| 2013/0322462 A1* | 12/2013 | Poulsen .................... H04J 3/06 370/458 |
| 2018/0004541 A1* | 1/2018 | Jang ....................... G06F 1/3287 |

FOREIGN PATENT DOCUMENTS

JP    2008-293230 A    12/2008

* cited by examiner

*Primary Examiner* — Henry Tsai
*Assistant Examiner* — Aurangzeb Hassan
(74) *Attorney, Agent, or Firm* — Pearne & Gordon LLP

(57) ABSTRACT

A data communication apparatus for performing communication of data with a master device via a bus includes a clock control signal generation circuit that outputs a clock control signal corresponding to a reset state and a communication state of the data communication apparatus, a communication start detection circuit that detects a start of communication on the basis of a clock signal on the bus and the data, a clock generation circuit that generates an internal clock signal on the basis of the clock signal on the bus, and a data processing control circuit that receives the internal clock signal and controls communication of the data with the master device. The clock generation circuit stops generating the internal clock signal in accordance with the clock control signal, in the reset state of the data communication apparatus and in a period from release of the reset state to the start of communication.

12 Claims, 17 Drawing Sheets

(1) | S | SArd | R | A | Drd | T |----------| Drd | T | P |

(1) | S | SArd | R | N | P |

FIG. 15

DATA COMMUNICATION APPARATUS

This application claims priority from Japanese Patent Application No. 2017-215646 filed on Nov. 8, 2017. The content of this application is incorporated herein by reference in its entirety.

BACKGROUND OF THE DISCLOSURE

1. Field of the Disclosure

The present disclosure relates to a data communication apparatus.

2. Description of the Related Art

Methods are known in data communication between a plurality of devices, such as in the Inter Integrated Circuit ($I^2C$) protocol, in which a two-wire bus created by a clock supply line and a data communication line is used to perform bidirectional data communication. Specifically, for example, among a plurality of devices connected to the bus, a device (master device) that controls a data communication state provides a clock to the other devices (slave devices) via the bus. Then, each of the slave devices generates an internal clock therein on the basis of the clock on the bus, and a combination of the internal clock and the data on the bus implements data communication.

However, internal clock generation involves power consumption of each slave device. To reduce power consumption, it is thus desirable to stop generating an internal clock when no internal clock is required. For example, Japanese Unexamined Patent Application Publication No. 2008-293230 discloses a data transfer apparatus in which the necessity of clock is determined for each device and the internal clock of a device to which the supply of clock is determined to be unnecessary is stopped to reduce power consumption.

In the apparatus disclosed in Japanese Unexamined Patent Application Publication No. 2008-293230, for example, when a new slave device is connected to a bus on which communication is currently being carried out, reception of clock on the bus is started at the same time as the connection and an internal clock is generated. However, the slave device does not actually start communication until the slave device receives a communication start signal (start condition). Thus, after the slave device is connected to the bus, internal clock generation is unnecessary until communication is started. However, such internal clock generation consumes unnecessary power.

BRIEF SUMMARY OF THE DISCLOSURE

Accordingly, it is an object of the present disclosure to provide a data communication apparatus that stops generating an internal clock at unnecessary timing and reduces power consumption.

According to preferred embodiments of the present disclosure, a data communication apparatus is a data communication apparatus for performing communication of data with a master device via a bus. The data communication apparatus includes a clock control signal generation circuit that outputs a clock control signal corresponding to a reset state of the data communication apparatus and a communication state of the data communication apparatus, a communication start detection circuit that detects a start of communication on the basis of a clock signal on the bus and on the basis of the data, a clock generation circuit that generates an internal clock signal on the basis of the clock signal on the bus, and a data processing control circuit that is supplied with the internal clock signal and controls communication of the data with the master device. The clock generation circuit stops generating the internal clock signal in accordance with the clock control signal, in the reset state of the data communication apparatus and in a period from release of the reset state to the start of communication.

According to preferred embodiments of the present disclosure, it may be possible to provide a data communication apparatus that stops generating an internal clock at unnecessary timing and reduces power consumption.

Other features, elements, characteristics and advantages of the present disclosure will become more apparent from the following detailed description of preferred embodiments of the present disclosure with reference to the attached drawings.

BRIEF DESCRIPTION OF THE SEVERAL VIEWS OF THE DRAWINGS

FIG. 15 is a diagram illustrating an example structure of data communicated by the data communication apparatus according to the embodiment of the present disclosure;

DETAILED DESCRIPTION OF THE DISCLOSURE

The following describes an embodiment of the present disclosure in detail with reference to the drawings. The same or substantially the same elements are assigned the same numerals and will not be described repeatedly.

Figure 1:
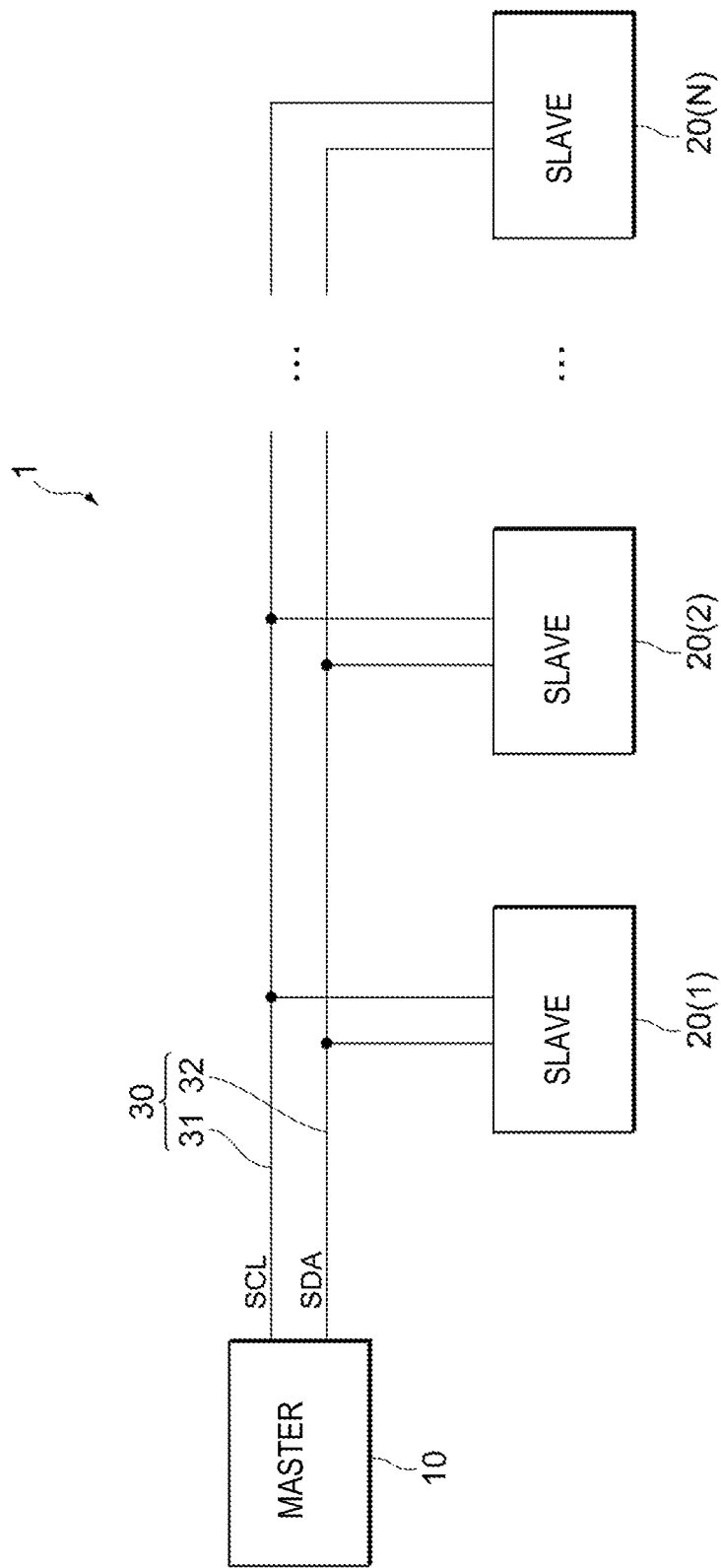
FIG. 1 is a diagram illustrating an example configuration of a communication system including a data communication apparatus according to an embodiment of the present disclosure.

FIG. 1 is a diagram illustrating an example configuration of a communication system including a data communication apparatus according to an embodiment of the present disclosure. A communication system 1 illustrated in FIG. 1 is a communication system that enables bidirectional communication using a two-wire bus such as in the I²C protocol. The communication system 1 may conform to the I²C protocol or any other communication protocol.

The communication system 1 includes, for example, a master device 10, N slave devices 20(1) to 20(N), where N is an integer greater than or equal to 1, and a bus 30 that connects the master device 10 and the N slave devices 20(1) to 20(N) to each other.

The master device 10 is a device in a master mode having the privilege to control data communication in the communication system 1. The master device 10 controls data communication with each of the N slave devices 20(1) to 20(N) via the bus 30 described below.

Each of the slave devices 20(1) to 20(N) is a device in a slave mode operating under control of the master device 10. The slave devices 20(1) to 20(N) are each assigned a unique slave address. The unique slave addresses are used to implement data communication between the master device 10 and the plurality of slave devices 20(1) to 20(N).

The bus 30 is implemented as a bidirectional two-wire bus including a serial clock (SCL) line 31 and a serial data (SDA) line 32. The master device 10 provides clock and data to the slave devices 20(1) to 20(N) via the SCL line 31 and the SDA line 32, respectively, to control the data communication state of the entire communication system 1. For example, the master device 10 transmits the slave address of one of the slave devices 20(1) to 20(N) to and from which the master device 10 desires to transmit and receive data and information indicating a write or read of the data via the SDA line 32. Then, the master device 10 transmits and receives write data or read data to and from the slave device designated by the slave address via the SDA line 32. Accordingly, data communication is performed between one of the slave devices 20(1) to 20(N) designated by the slave address and the master device 10. This data communication method will be described in further detail below.

Figure 2:
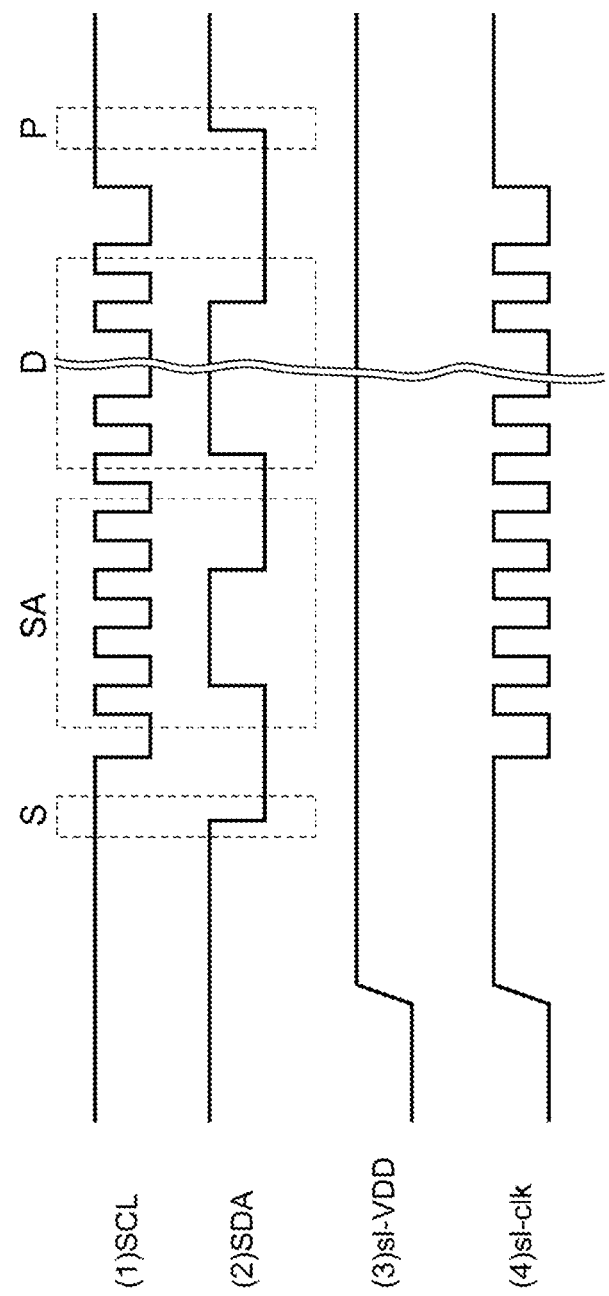
FIG. 2 is a timing chart for a communication system according to a comparative example from a start of communication to an end of communication.

FIG. 2 is a timing chart for a communication system according to a comparative example from a start of communication to an end of communication. Specifically, in the timing chart illustrated in FIG. 2, part (1) depicts a clock signal SCL on a bus in the communication system according to the comparative example, part (2) depicts a data signal SDA on the bus, part (3) depicts a power supply voltage sl-VDD of a predetermined slave device in the communication system according to the comparative example, and part (4) depicts an internal clock signal sl-clk of the predetermined slave device. The communication system according to the comparative example is, for example, a communication system conforming to a typical data communication protocol employed in the I²C standard. In FIG. 2, an image of each signal is illustrated, and the actual number of bits is not reflected.

As depicted in parts (1) and (2) in FIG. 2, the clock signal SCL on the bus and the data signal SDA on the bus repeat high and low states. Data communication is started with a start condition (start condition S), which is a state in which the data signal SDA is changed from high to low when the clock signal SCL remains high. Subsequently, a slave address SA assigned to a slave device to which data is to be communicated is transferred, followed by the transfer of data D to be transferred. After the transfer of the data D, data communication ends with a stop condition (stop condition P), which is a state in which the data signal SDA is changed from low to high when the clock signal SCL remains high.

At this time, as depicted in parts (3) and (4) in FIG. 2, in the slave device, upon and after an increase in the power supply voltage sl-VDD, the internal clock signal sl-clk is generated in synchronization with the clock signal SCL. A combination of the internal clock signal sl-clk and the received data signal SDA implements a variety of types of data communication.

The generation of the internal clock signal sl-clk based on the clock signal SCL on the bus involves power consumption. In addition, the internal clock signal sl-clk is likely to comparatively generate noise, which may cause unwanted radiation. However, the internal clock signal sl-clk need not always be generated in synchronization with the clock signal SCL on the bus. Thus, the generation of the internal clock signal sl-clk is stopped appropriately in accordance with the state of data communication, which can reduce power consumption and prevent the occurrence of unwanted radiation. The following describes various conditions under which the generation of the internal clock signal sl-clk can be stopped.

Clock Stop Condition 1

Figure 3:
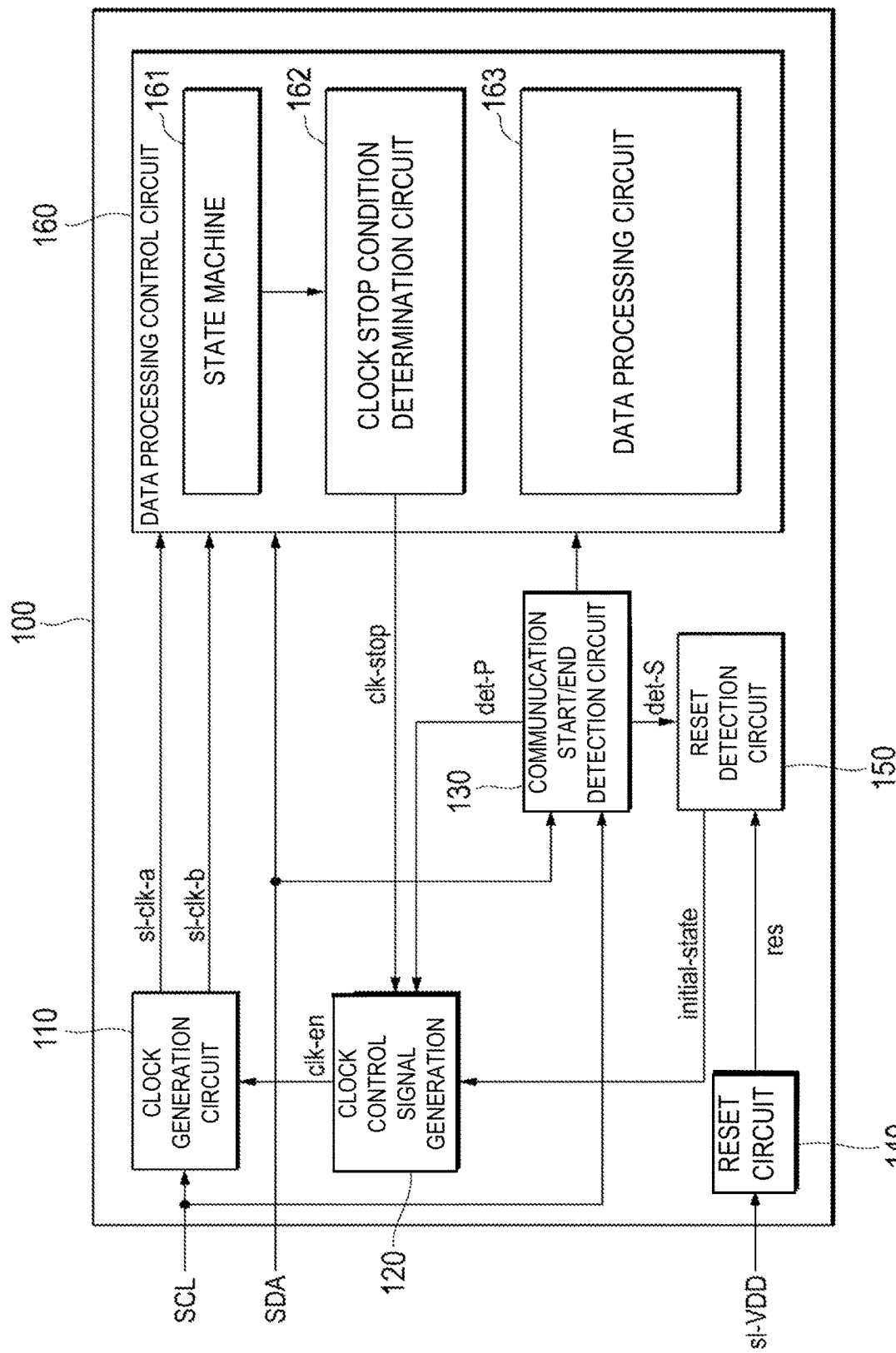
FIG. 3 is a block diagram illustrating an example configuration of the data communication apparatus according to the embodiment of the present disclosure.

FIG. 3 is a block diagram illustrating an example configuration of a data communication apparatus according to an embodiment of the present disclosure. A data communication apparatus 100 illustrated in FIG. 3 corresponds to a predetermined slave device included in the communication system 1 illustrated in FIG. 1. Specifically, the data communication apparatus 100 includes a clock generation circuit 110, a clock control signal generation circuit 120, a communication start/end detection circuit 130, a reset circuit 140, a reset detection circuit 150, and a data processing control circuit 160.

The clock generation circuit 110 generates an internal clock signal sl-clk on the basis of a clock signal SCL on a bus and a clock control signal clk-en supplied from the clock control signal generation circuit 120, and outputs the internal clock signal sl-clk to the data processing control circuit 160. The internal clock signal sl-clk includes an internal clock signal sl-clk-a, which is the same as the clock signal SCL on the bus, and an internal clock signal sl-clk-b, which is obtained by inverting the clock signal SCL on the bus. In the following description, the internal clock signal sl-clk-a and the internal clock signal sl-clk-b are also collectively referred to as "the internal clock signal sl-clk" unless these signals need to be identified for some purpose.

The clock control signal generation circuit 120 generates the clock control signal clk-en for controlling whether the clock generation circuit 110 is to generate the internal clock signal sl-clk, and outputs the clock control signal clk-en to the clock generation circuit 110. The clock control signal clk-en is switched in accordance with, in addition to the start condition and the stop condition, various clock stop conditions of the internal clock signal sl-clk described below.

Figure 4:
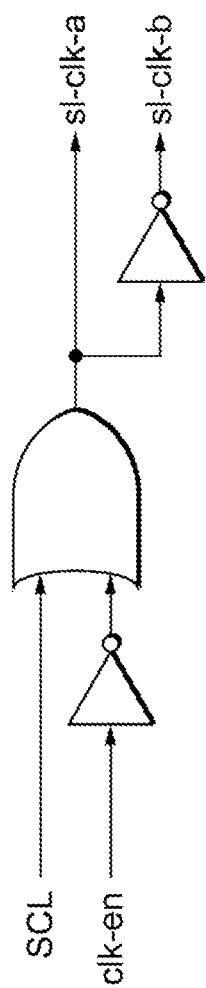
FIG. 4 is a diagram illustrating an example logical expression used when a clock generation circuit generates internal clock signals on the basis of a clock signal on a bus and a clock control signal.

FIG. 4 is a diagram illustrating an example logical expression used when the clock generation circuit 110 generates the internal clock signals sl-clk-a and sl-clk-b on the basis of the clock signal SCL on the bus and the clock control signal clk-en. As illustrated in FIG. 4, when the clock control signal clk-en is high, the internal clock signal sl-clk-a having the same high and low timings as the clock signal SCL on the bus, and the internal clock signal sl-clk-b, which is obtained by inverting the internal clock signal sl-clk-a, are generated. On the other hand, when the clock control signal clk-en is low, the internal clock signal sl-clk-a is kept high and the internal clock signal sl-clk-b is kept low. That is, switching the clock control signal clk-en between high and low makes it possible to stop the operation of the internal clock signals sl-clk-a and sl-clk-b.

Referring back to FIG. 3, the communication start/end detection circuit 130 determines, on the basis of a combination of the clock signal SCL on the bus and the data signal SDA, whether both signals indicate a start condition or a stop condition, and detects a start and end of communication. Then, the communication start/end detection circuit 130 outputs a start detection signal det-S indicating a start of communication to the reset detection circuit 150 and outputs an end detection signal det-P indicating an end of communication to the clock control signal generation circuit 120. The signals indicating the start and end of communication are also supplied to the data processing control circuit 160.

The reset circuit 140 is, for example, a power-on reset circuit that generates a reset signal res corresponding to the power supply voltage sl-Vdd supplied from outside the data communication apparatus 100. The reset signal res is a signal for keeping the data communication apparatus 100 in a reset state when the power supply voltage sl-VDD is less than a predetermined level (e.g., in a period from when the power supply voltage sl-VDD is applied to the data communication apparatus 100 to when the power supply voltage sl-VDD exceeds a level at which the data communication apparatus 100 operates correctly). During the reset state, for example, a state machine 161 described below initializes the data communication apparatus 100 (power-on reset). Since no data communication takes place during the reset state, there is no need to generate the internal clock signal sl-clk during the reset state.

The reset detection circuit 150 generates a state signal initial-state indicating at least a start of the reset state of the data communication apparatus 100 on the basis of the reset signal res supplied from the reset circuit 140, and outputs the state signal initial-state to the clock control signal generation circuit 120. Thus, when the data communication apparatus 100 is in the reset state, the generation of the internal clock signal sl-clk by the clock generation circuit 110 is stopped in accordance with the state signal initial-state. The reset detection circuit 150 is also supplied with the start detection signal det-S indicating a start of communication from the communication start/end detection circuit 130. The state signal initial-state is switched from high to low at the start of communication on the basis of the start detection signal det-S. That is, the state signal initial-state indicates the reset state of the data communication apparatus 100 and a period from the release of the reset state to the detection of a start condition. Thus, the reset detection circuit 150 can stop the generation of the internal clock signal sl-clk, in addition to during the reset state, until the next start condition is detected after the release of the reset state.

The data processing control circuit 160 is supplied with the internal clock signals sl-clk-a and sl-clk-b and controls data communication with the master device. Specifically, the data processing control circuit 160 includes the state machine 161, a clock stop condition determination circuit 162, and a data processing circuit 163.

The state machine 161 controls various states in data communication, such as a communication state, a reset state, and a waiting state.

The clock stop condition determination circuit 162 determines, in accordance with the communication state controlled by the state machine 161 or data received from the bus, whether the data indicates a clock stop condition for stopping the internal clock signal sl-clk. Then, the clock stop condition determination circuit 162 generates a clock stop signal clk-stop for stopping the internal clock signal sl-clk and outputs the clock stop signal clk-stop to the clock control signal generation circuit 120. Specific clock stop conditions of the internal clock signal sl-clk will be described in detail below.

The data processing circuit 163 processes data to be transmitted or received data.

Figure 5:
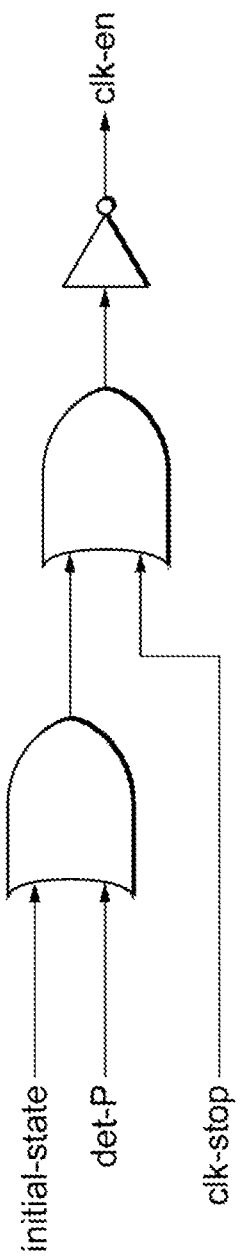
FIG. 5 is a diagram illustrating an example logical expression used when a clock control signal generation circuit generates a clock control signal on the basis of a state signal, an end detection signal, and a clock stop signal.

FIG. 5 is a diagram illustrating an example logical expression used when the clock control signal generation circuit 120 generates the clock control signal clk-en on the basis of the state signal initial-state, the end detection signal det-P, and the clock stop signal clk-stop. As illustrated in FIG. 5, the clock control signal clk-en becomes low when at least one of the following conditions hold: when the data communication apparatus 100 is in the reset state, when the current time is within the period from the release of the reset state to the detection of a start condition (i.e., when the state signal initial-state is high), when an end of communication is detected (i.e., when the end detection signal det-P is high), and when a clock stop condition of the internal clock signal sl-clk is satisfied (i.e., when the clock stop signal clk-stop is high). Accordingly, the generation of the internal clock signal sl-clk is stopped.

Figure 6:
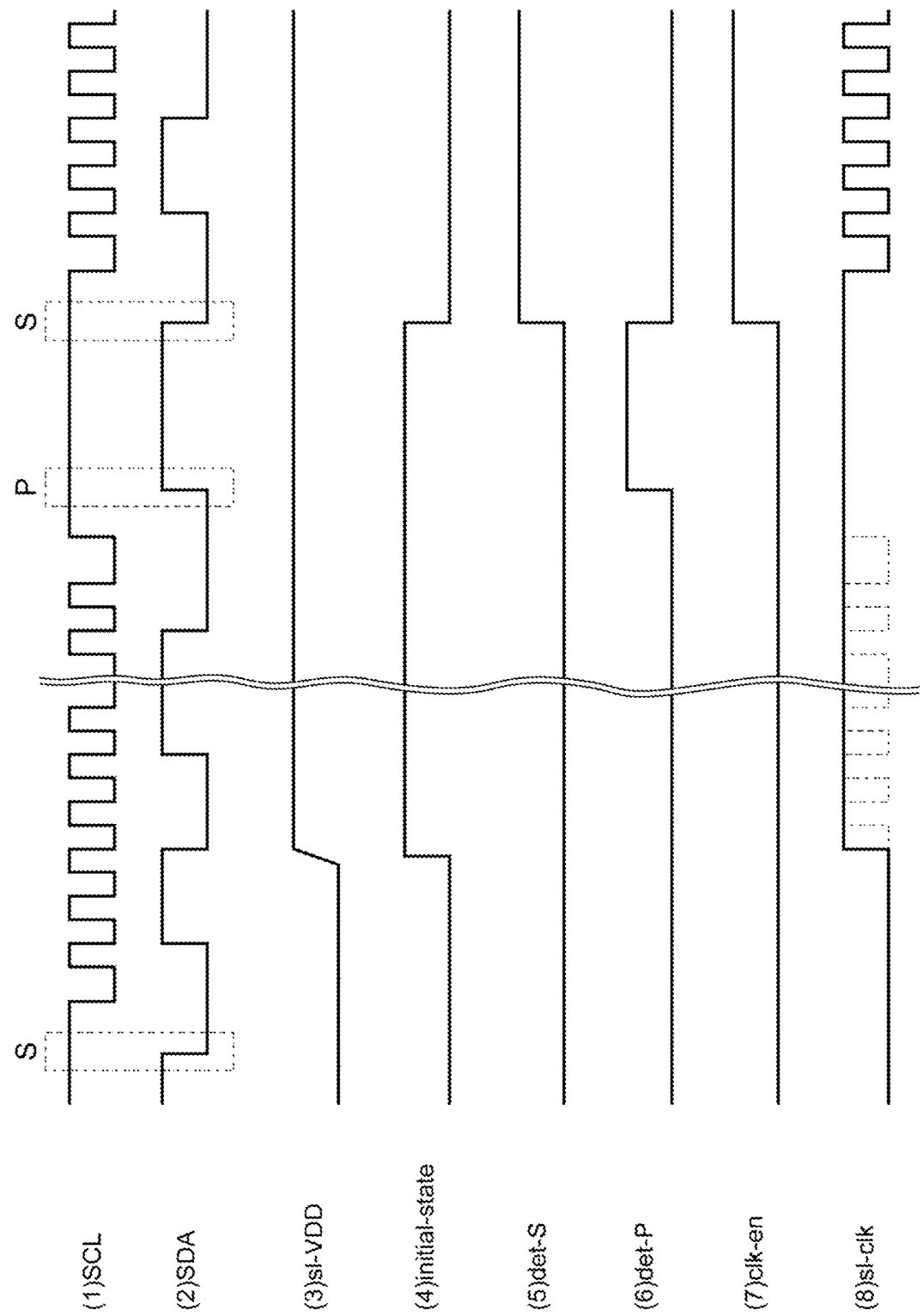
FIG. 6 is a timing chart for the data communication apparatus according to the embodiment of the present disclosure.

FIG. 6 is a timing chart for a data communication apparatus according to an embodiment of the present disclosure. Specifically, FIG. 6 is a timing chart when, during data communication between the master device and other slave devices, a power supply voltage of a new slave device (corresponding to the data communication apparatus 100 illustrated in FIG. 3) is applied. In FIG. 6, part (1) depicts the clock signal SCL on the bus, part (2) depicts the data signal SDA on the bus, part (3) depicts the power supply voltage sl-VDD, part (4) depicts the state signal initial-state, part (5) depicts the start detection signal det-S, part (6) depicts the end detection signal det-P, part (7) depicts the clock control signal clk-en, and part (8) depicts the internal clock signal sl-clk. The reset signal res and the clock stop signal clk-stop illustrated in FIG. 3 are not illustrated in FIG. 6.

As depicted in parts (3) and (4) in FIG. 6, when the power supply voltage sl-VDD of a new slave device is applied during data communication between the master device and other slave devices, the new slave device enters the reset state. Thus, the state signal initial-state is changed from low to high. Accordingly, the clock control signal clk-en is kept low. This avoids the immediate generation of the internal clock signal sl-clk in synchronization with the clock signal SCL on the bus. The state signal initial-state is kept high even after the reset state is released. When the communication start/end detection circuit 130 detects the next start condition S, the start detection signal det-S is changed from low to high. Then, the reset detection circuit 150, to which the start detection signal det-S is supplied, changes the state signal initial-state from high to low. Accordingly, the clock control signal clk-en is changed from low to high for the first time, and the internal clock signal sl-clk starts to be generated.

According to this embodiment, as described above, it is possible to not only stop the internal clock signal sl-clk in the duration of the reset state but also continuously stop the internal clock signal sl-clk until a start of the next communication session is detected even after the release of the reset state.

The operation according to this embodiment is compared with the operation according to the comparative example illustrated in FIG. 2. In the comparative example, the application of a power supply voltage causes the internal clock signal to be enabled in synchronization with the clock signal on the bus (see a broken line in part (8) in FIG. 6). In this embodiment, in contrast, the internal clock signal sl-clk can be stopped until the next start condition S is detected. Thus, the data communication apparatus 100 can reduce power consumption, compared to the comparative example, and can prevent the occurrence of unwanted radiation.

The reset signal res may be supplied to the reset detection circuit 150 at a time other than when the power supply voltage sl-VDD is applied. For example, even during data communication, if a reset is applied to the data communication apparatus 100 for some reason, the reset circuit 140 may accept the reset. Also in this case, similarly to when the power supply voltage sl-VDD is applied, the reset signal res supplied to the reset detection circuit 150 is changed from low to high, thereby changing the state signal initial-state from low to high. As a result, the generation of the internal clock signal sl-clk is stopped.

Next, clock stop conditions (clock stop conditions 2 to 7) of the internal clock signal sl-clk, which are determined in the clock stop condition determination circuit 162, will be described.

Clock Stop Condition 2

Figure 7:
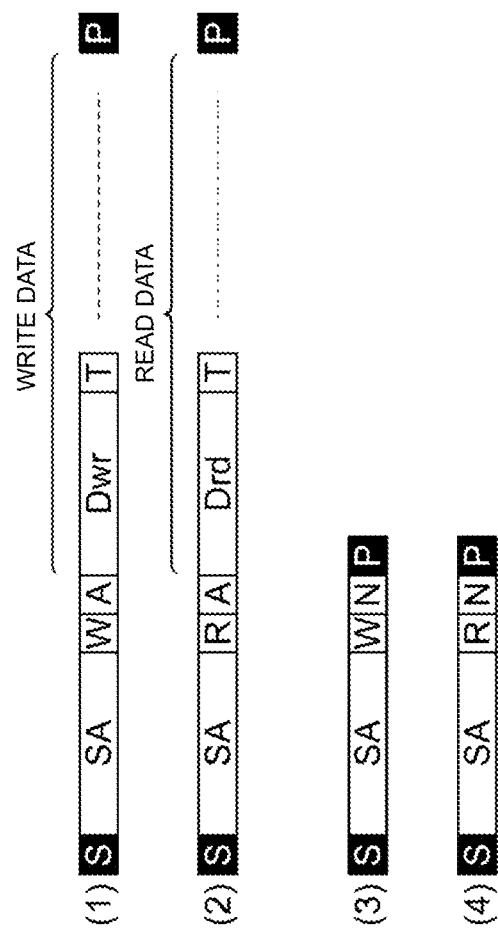
FIG. 7 is a diagram illustrating an example structure of data communicated by the data communication apparatus according to the embodiment of the present disclosure.

FIG. 7 is a diagram illustrating an example structure of data communicated by a data communication apparatus according to an embodiment of the present disclosure. Specifically, in FIG. 7, parts (1) and (2) depict data structures when a slave device having a slave address that matches a slave address resides on the bus, and parts (3) and (4) depict data structures when a slave device having a slave address that matches the slave address does not reside on the bus. Further, parts (1) and (3) depict data structures for writing, and parts (2) and (4) depict data structures for reading. In FIG. 7, symbol S denotes a start condition, symbol P denotes a stop condition, symbol A denotes an acknowledgement (ACK), symbol N denotes a negative acknowledgement (NACK), symbol W denotes a write request, symbol R denotes a read request, symbol T denotes a transition bit, symbol SA denotes a slave address, symbol Dwr denotes write data, and symbol Drd denotes read data. The same symbols are used in the subsequent drawings.

As illustrated in FIG. 7, the start condition S is followed by the slave address SA and the write request W or the read request R. When a slave device having a slave address that matches the slave address SA resides on the bus, the slave device outputs ACK and writes the write data Dwr or reads the read data Drd, and the stop condition P is reached. When a slave device having a slave address that matches the slave address SA does not reside on the bus, on the other hand, each slave device outputs NACK, and the stop condition P is reached. The write data Dwr includes, for example, an error check bit (a transition bit T for reading) for determining whether the data includes an error. The error check bit may be, for example, a parity bit.

Figure 8:
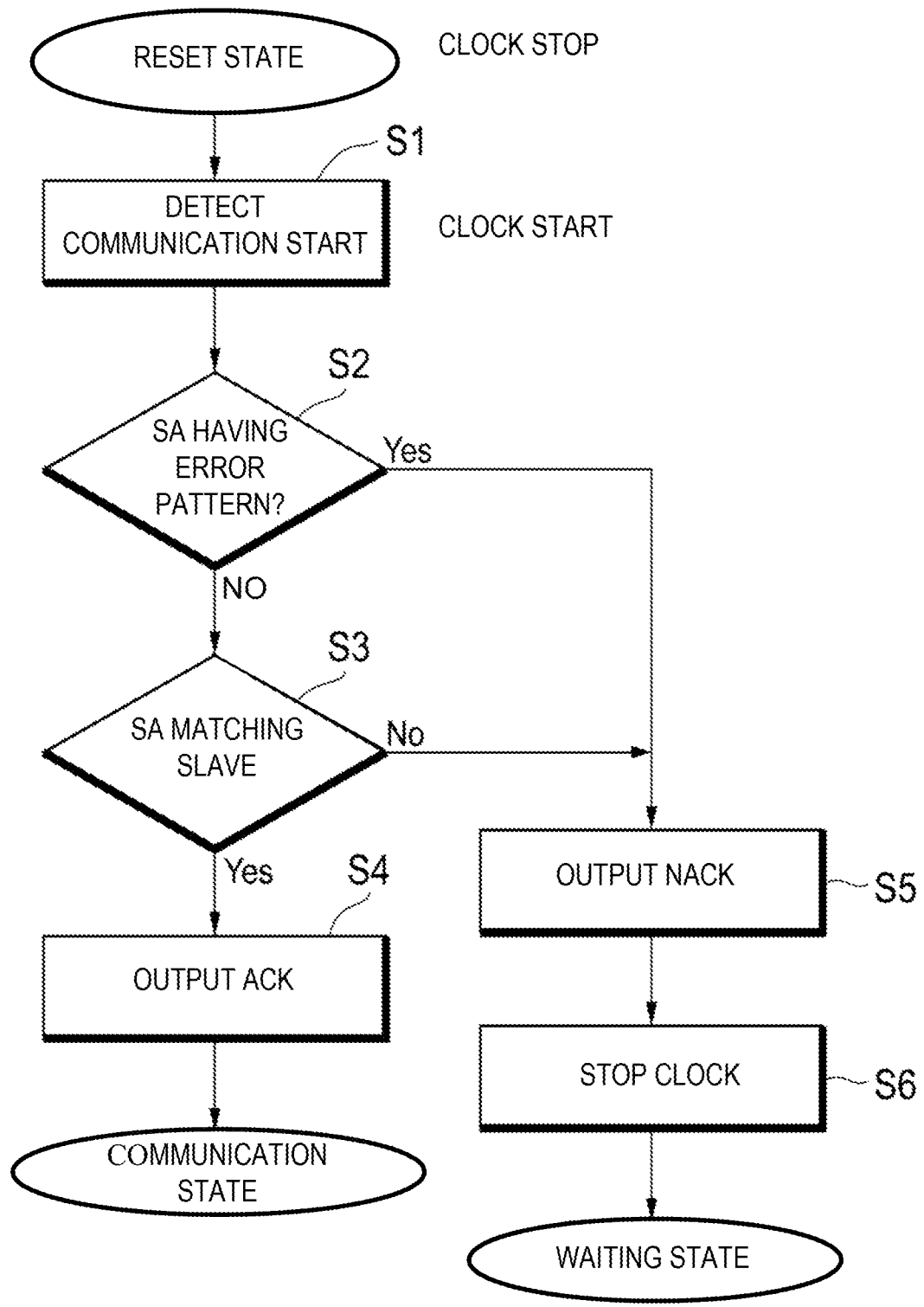
FIG. 8 is a flowchart when the data communication apparatus according to the embodiment of the present disclosure receives a slave address.

FIG. 8 is a flowchart when a data communication apparatus according to an embodiment of the present disclosure receives a slave address. The flowchart illustrated in FIG. 8 indicates a variety of conditions in a process, and steps in the flowchart are not necessarily in chronological order. The same applies to flowcharts described below.

First, a power supply voltage is applied to a slave device, and the slave device is in the reset state. At this time, as described above, the internal clock signal sl-clk is inactive. When the communication start/end detection circuit 130 detects a start of communication, the generation of the internal clock signal sl-clk is started (S1). Then, the slave device receives a slave address SA, and the clock stop condition determination circuit 162 determines whether the slave address SA has a predetermined error pattern (S2). As used herein, the expression "having a predetermined error pattern" is used to include not only having a pattern indicating that data shows a predetermined error, but also identifying an error by using a parity check or the like.

If the slave address SA has the predetermined error pattern (S2: Yes), the slave device outputs NACK (S5). Thereafter, the internal clock signal sl-clk in the slave device is no longer necessary. Thus, the clock stop condition determination circuit 162 outputs the clock stop signal clk-stop to the clock control signal generation circuit 120, and the generation of the internal clock signal sl-clk is stopped (S6). Then, the slave device enters the waiting state.

On the other hand, if the slave address SA does not have the predetermined error pattern (S2: No), the slave device determines whether the slave address SA matches the slave address assigned thereto (S3). If the slave address SA matches the slave address assigned to the slave device (S3: Yes), the slave device outputs ACK and continues communication. On the other hand, if the slave address SA does not match the slave address assigned to the slave device (S3: No), the slave device outputs NACK (S5). The clock stop condition determination circuit 162 outputs the clock stop signal clk-stop to the clock control signal generation circuit 120, and the generation of the internal clock signal sl-clk is stopped (S6). Then, the slave device enters the waiting state.

Figure 9:
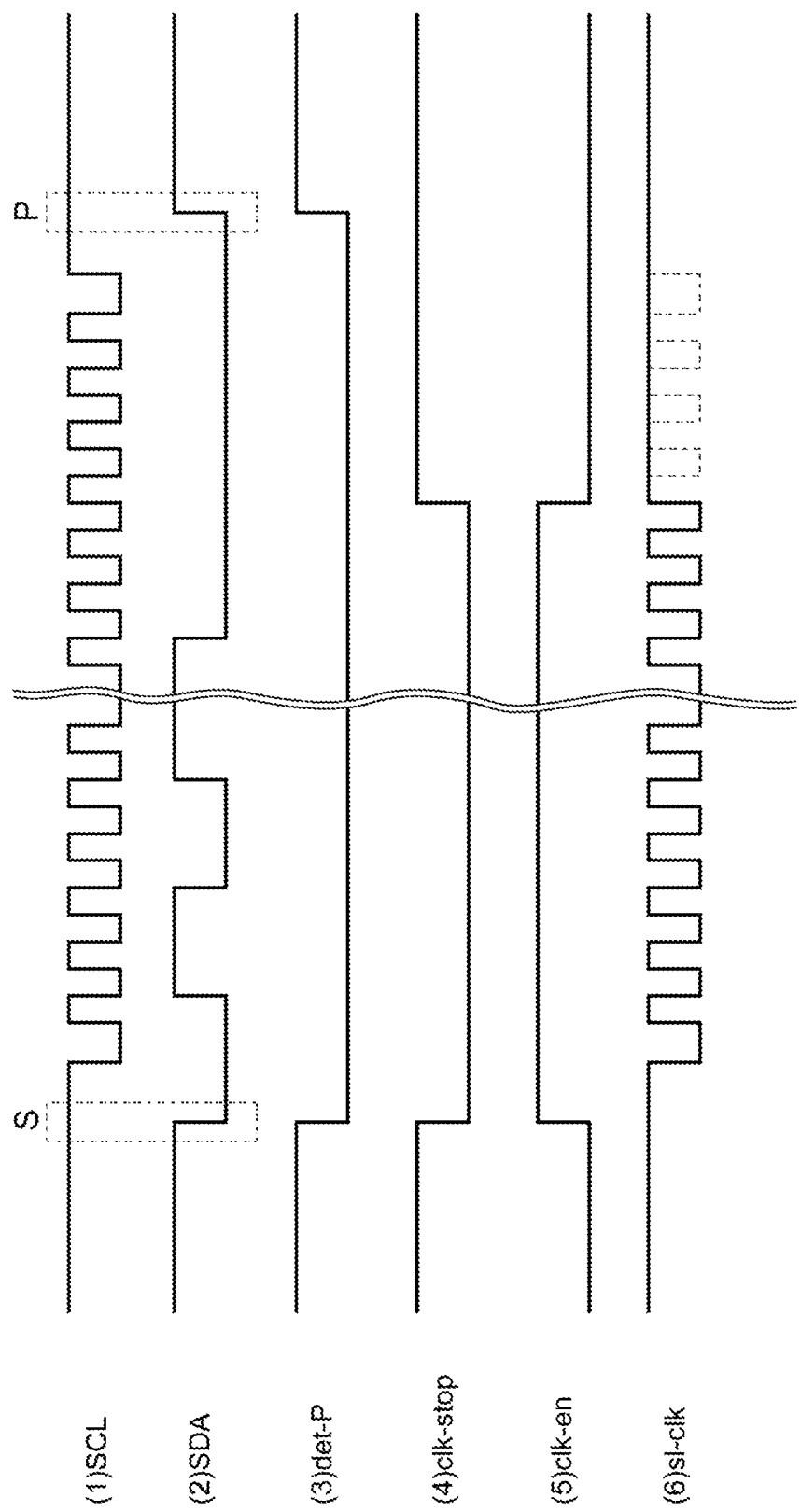
FIG. 9 is a timing chart for the data communication apparatus according to the embodiment of the present disclosure.

FIG. 9 is a timing chart for a data communication apparatus according to an embodiment of the present disclosure. Specifically, the timing chart illustrated in FIG. 9 indicates that data satisfies a clock stop condition and thus an internal clock signal is stopped during communication. In FIG. 9, part (1) depicts the clock signal SCL on the bus, part (2) depicts the data signal SDA on the bus, part (3) depicts the end detection signal det-P, part (4) depicts the clock stop signal clk-stop, part (5) depicts the clock control signal clk-en, and part (6) depicts the internal clock signal sl-clk.

As illustrated in FIG. 9, when a start of communication is detected (the start condition S), the clock control signal clk-en is changed from low to high, and the clock generation circuit 110 generates the internal clock signal sl-clk. At this time, the clock stop signal clk-stop is changed from high to low. Then, in a period from the start condition S to the stop condition P (i.e., during data communication), when a clock stop condition of the internal clock signal sl-clk is satisfied, such as when, as described above, the slave address SA has an error pattern, the clock stop condition determination circuit 162 changes the clock stop signal clk-stop from low to high. Accordingly, the clock control signal clk-en is changed from high to low, and accordingly the generation of the internal clock signal sl-clk is stopped.

According to this embodiment, as described above, the generation of the internal clock signal sl-clk can be stopped at the time when the internal clock signal sl-clk is determined to be unnecessary before the detection of the next stop condition P.

The operation according to this embodiment is compared with the operation in the configuration disclosed in Japanese Unexamined Patent Application Publication No. 2008-293230. In the configuration disclosed in Japanese Unexamined Patent Application Publication No. 2008-293230, even if the slave address SA has an error pattern, an internal clock signal is continuously generated until the next stop condition P is detected (see a broken line in part (6) in FIG. 9). In this embodiment, in contrast, the internal clock signal sl-clk can be stopped before the next stop condition P is satisfied. Thus, this embodiment can reduce power consumption, compared to the configuration disclosed in Japanese Unexamined Patent Application Publication No. 2008-293230, and prevent the occurrence of unwanted radiation.

Clock Stop Condition 3

Figure 10:
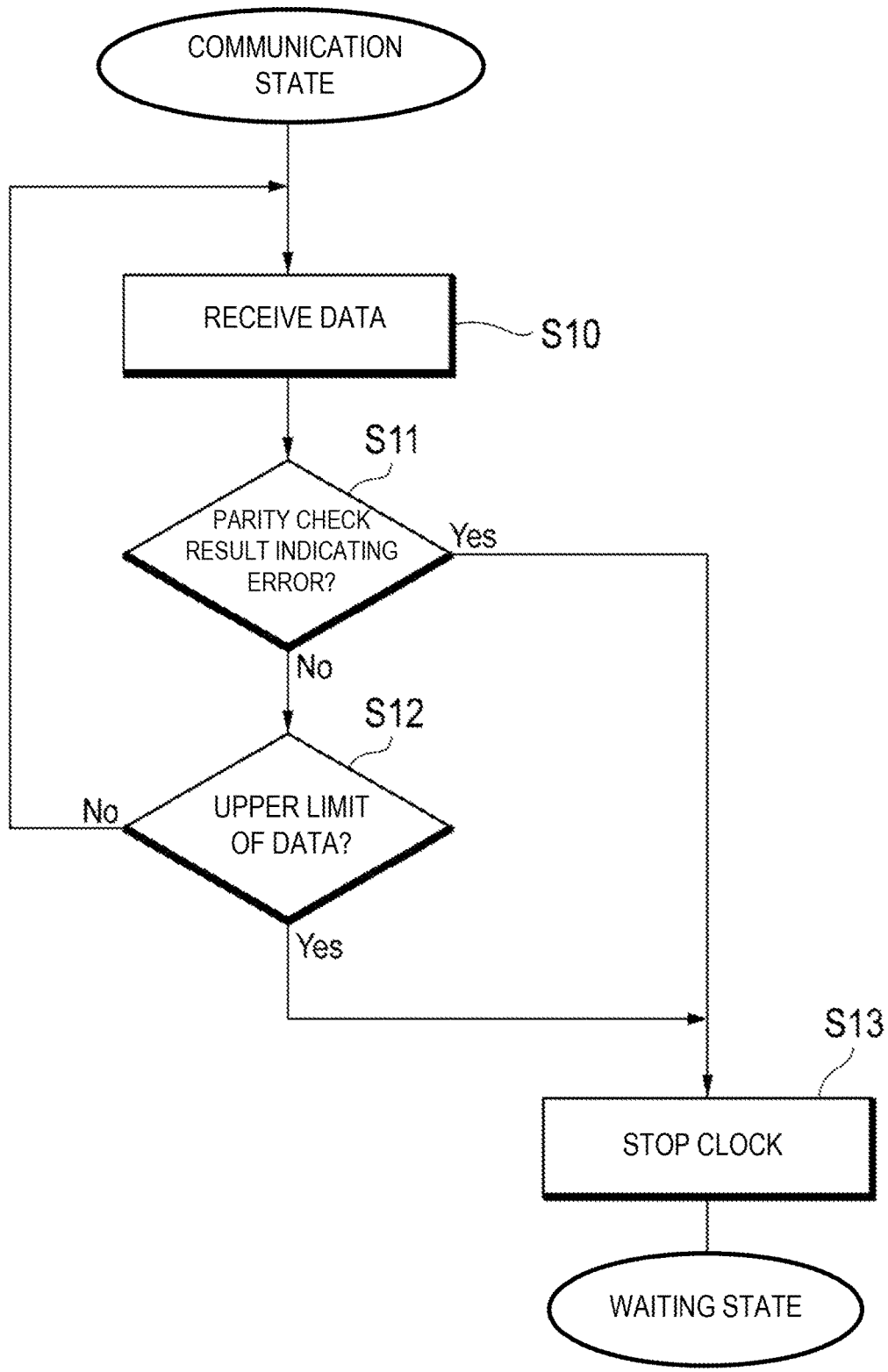
FIG. 10 is a flowchart when the data communication apparatus according to the embodiment of the present disclosure receives data.

FIG. 10 is a flowchart when a data communication apparatus according to an embodiment of the present disclosure receives data. It is assumed that a slave device, which is data communication apparatus according to an embodiment of the present disclosure, is determined to be a slave device assigned a slave address that matches the slave address SA in step S3 illustrated in FIG. 8, and is continuing communication. In the following description, a parity check is used as an error check in data, as an example. However, the error check method is not limited to any specific one. Further, the procedure for stopping the internal clock signal sl-clk is similar to that in the embodiment described above and will not be described in detail herein.

The slave device receives data on the bus (S10) and determines whether the data includes an error by using a parity check (S11). If the result of the parity check indicates that there is an error (S11: Yes), the generation of the internal clock signal sl-clk is stopped (S13).

On the other hand, if the result of the parity check indicates that there is no error (S11: No), data reception is repeatedly performed until the reception of all the bits of the data has been completed. Even before the reception of all the bits of the data is completed, if the amount of received data exceeds a predetermined upper limit (S12: Yes), no further data can be received, and thus the generation of the internal clock signal sl-clk is stopped (S13).

With the clock stop condition described above, this embodiment can also reduce power consumption, compared to the configuration disclosed in Japanese Unexamined Patent Application Publication No. 2008-293230, and prevent the occurrence of unwanted radiation.

Clock Stop Condition 4

Figure 11:
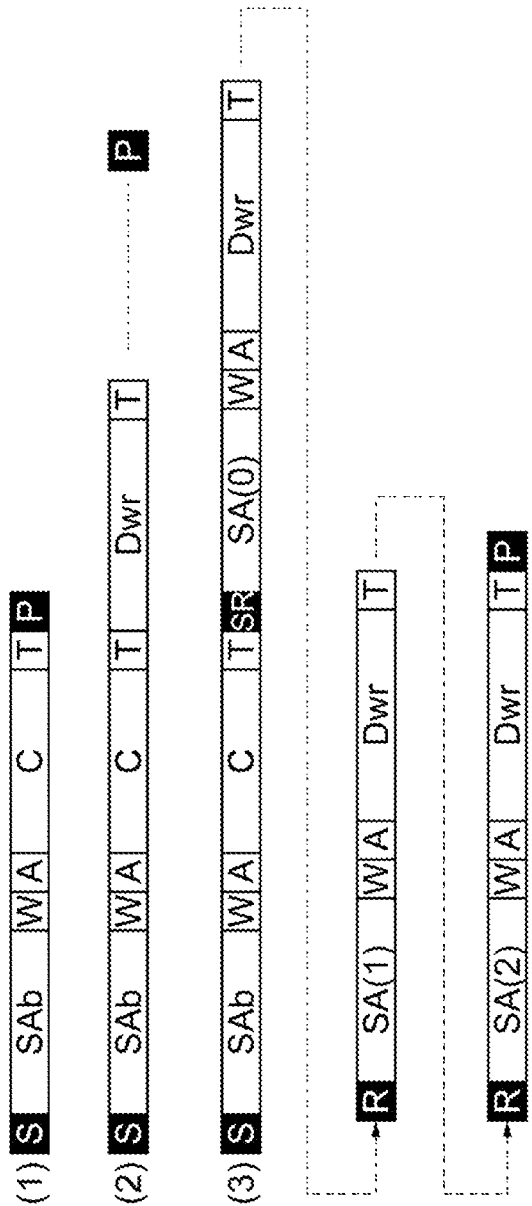
FIG. 11 is a diagram illustrating an example structure of data communicated by the data communication apparatus according to the embodiment of the present disclosure.

FIG. 11 is a diagram illustrating an example structure of data communicated by a data communication apparatus according to an embodiment of the present disclosure. Specifically, in FIG. 11, parts (1) to (3) depict data structures when a broadcast address SAb designating all the slave devices connected to the bus is included. In FIG. 11, symbol SR denotes a start repeat condition, symbol C denotes a command, symbol SAb denotes a broadcast address, and symbol SA(i) denotes the i-th slave address, where i is an integer. The same symbols are used in the subsequent drawings.

The data structure depicted in part (1) is, for example, a data structure when the master device designates all the slave devices by using the broadcast address SAb and transmits a common command to all the slave devices.

The data structure depicted in part (2) is, for example, a data structure when the master device designates all the slave devices by using the broadcast address SAb, transmits a common command to all the slave devices, and further transmits similar write data Dwr to all the slave devices.

The data structure depicted in part (3) is, for example, a data structure when the master device designates all the slave devices by using the broadcast address SAb, transmits a common command to all the slave devices, and further transmits specific write data Dwr to each of the slave devices. The number of slave devices is illustrative and is not limited to that illustrated in FIG. 11.

Figure 12:
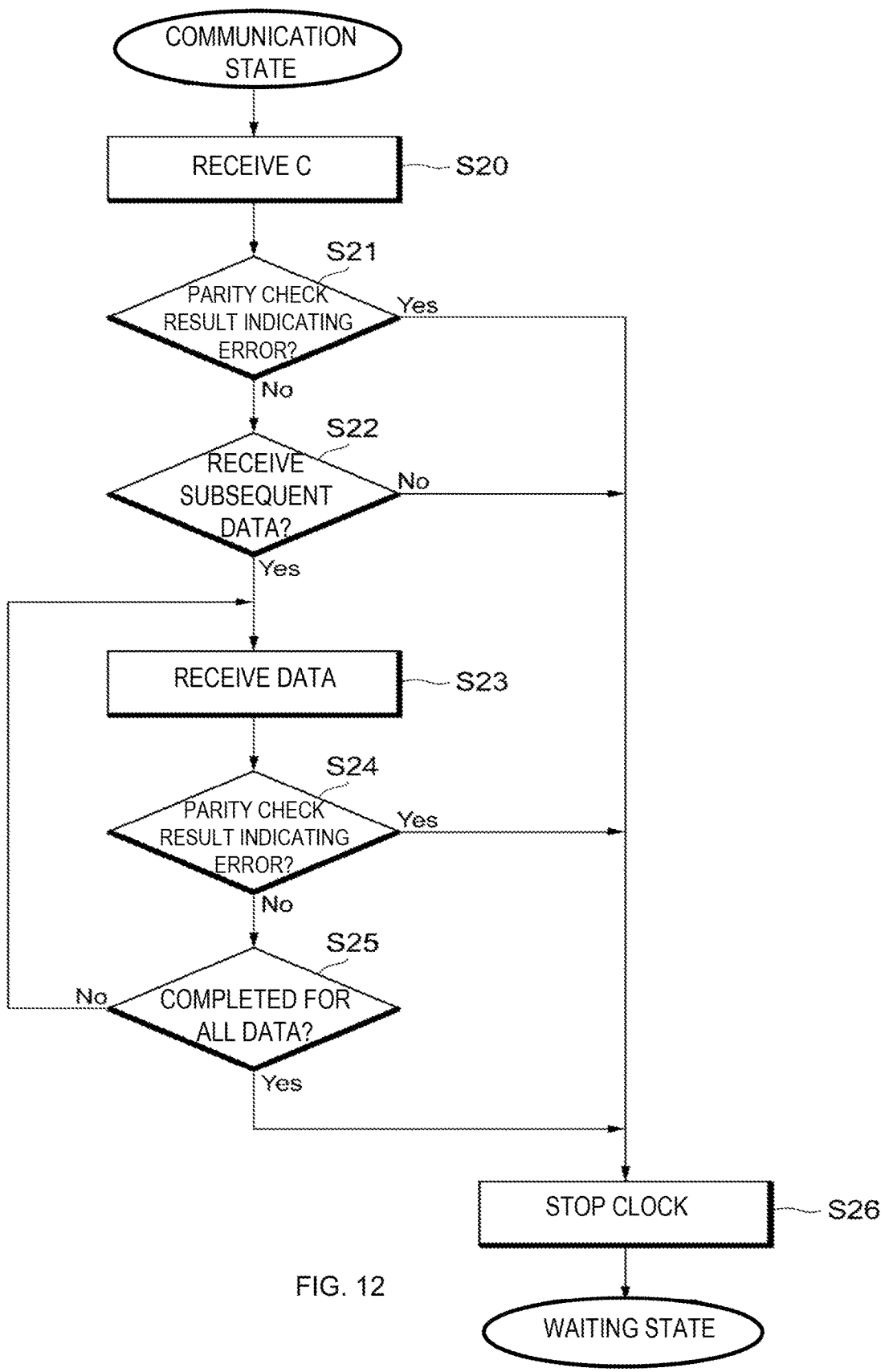
FIG. 12 is a flowchart when the data communication apparatus according to the embodiment of the present disclosure communicates data including a command.

FIG. 12 is a flowchart when a data communication apparatus according to an embodiment of the present disclosure communicates data including a command C.

First, a slave device receives the command C (S20). If the result of a parity check on the command C indicates that there is an error (S21: Yes), the generation of the internal clock signal sl-clk is stopped (S26). On the other hand, if the result of the parity check on the command C indicates that there is no error (S21: No), the slave device checks the command C and determines whether to receive subsequent data. Specifically, for example, if the command C is an end command or is a command for waiting until the next start repeat condition SR, there is no subsequent data to be received (S22: No). Thus, the generation of the internal clock signal sl-clk is stopped (S26).

On the other hand, if there is subsequent data to be received (S22: Yes), the slave device receives data (S23). As in the operation flow described above, if the result of a parity check on the data indicates that there is an error (S24: Yes), the generation of the internal clock signal sl-clk is stopped (S26). If the result indicates that there is no error (S24: No), when not all the bits of the data have been received (S25: No), data reception is repeatedly performed. If the reception of all the bits of the data has been completed (S25: Yes), the generation of the internal clock signal sl-clk is stopped (S26).

With the clock stop condition described above, this embodiment can also reduce power consumption, compared to the configuration disclosed in Japanese Unexamined Patent Application Publication No. 2008-293230, and prevent the occurrence of unwanted radiation.

Clock Stop Condition 5

Figure 13:
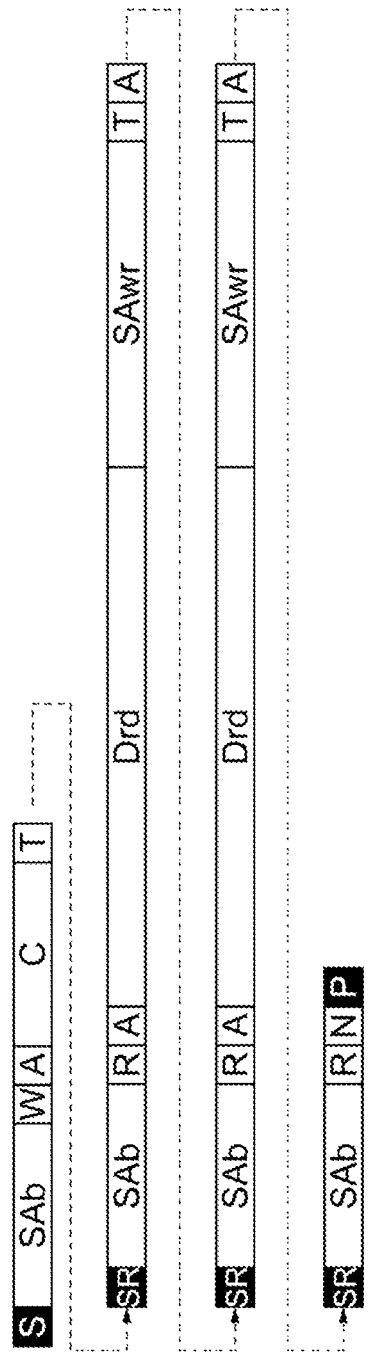
FIG. 13 is a diagram illustrating an example structure of data communicated by the data communication apparatus according to the embodiment of the present disclosure.

FIG. 13 is a diagram illustrating an example structure of data communicated by a data communication apparatus according to an embodiment of the present disclosure. Specifically, FIG. 13 illustrates a data structure when a slave address is dynamically assigned (hereinafter also referred to as "dynamic address assignment"). In FIG. 13, symbol SAwr denotes a slave address. The same symbol is used in the subsequent drawings.

Dynamic address assignment is a scheme in which slave addresses of slave devices connected to a bus are not determined in advance and the master device assigns an address to each of the slave devices through data communication. When a plurality of slave devices are connected to a bus, a conflict may occur between the plurality of slave devices in terms of the order in which the plurality of slave devices are assigned addresses. Thus, arbitration is required to determine the order in which slave devices that conflict are assigned addresses.

Specifically, as illustrated in FIG. 13, first, the broadcast address Sab is used to designate all the slave devices connected to a bus, and then the command C is used to provide an instruction to perform dynamic address assignment. Then, subsequently to the start repeat condition SR, all the slave devices are designated again. In response to the designation, slave devices, each of which needs to be assigned an address, output ACK and output read data Drd for making an address assignment request (e.g., a predetermined data pattern unique to each slave device) bit-by-bit simultaneously. Then, each time 1 bit of the read data Drd is outputted, each slave device is determined to be a winning or losing slave device in accordance with a predetermined rule. Specifically, for example, when the master device outputs a high or low value onto the bus, a slave device that has outputted a value that matches the value on the bus is determined to be a winner, whereas a slave device that has outputted a value that does not match the value on the bus is determined to be a loser. This procedure is repeatedly performed to uniquely determine a final winning slave device. The slave address SAwr is written to the final winning slave device, and the final winning slave device outputs ACK.

The procedure described above is repeatedly performed until all the slave devices connected to the bus have been assigned addresses. During the procedure, the clock signal on the bus is continuously supplied to all the slave devices. When all the slave devices have been assigned addresses, NACK is outputted and the stop condition P is reached. Note that a slave device that has been assigned an address does not need to participate in the subsequent arbitration and thus does not need to output the read data Drd for making an address assignment request.

Figure 14:
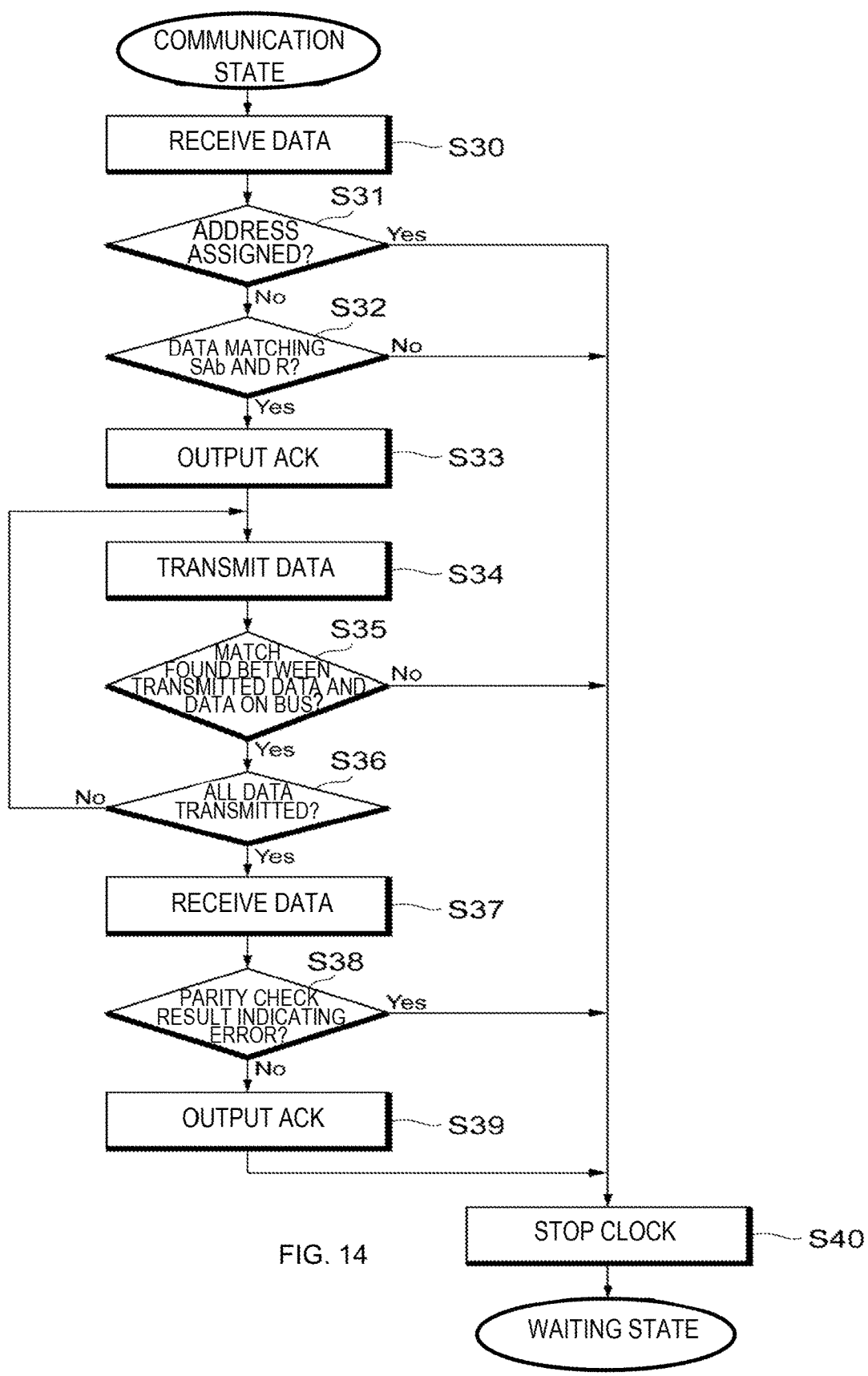
FIG. 14 is a flowchart when the data communication apparatus according to the embodiment of the present disclosure is dynamically assigned an address.

FIG. 14 is a flowchart when a data communication apparatus according to an embodiment of the present disclosure is dynamically assigned an address.

First, a slave device receives data for starting dynamic address assignment (the broadcast address Sab, the command C, and so on) (S30) and determines whether an address has been assigned to the slave device (S31). If an address has been assigned to the slave device (S31: Yes), the slave device does not need to participate in the subsequent arbitration. Thus, the generation of the internal clock signal sl-clk is stopped (S40). If no address has been assigned to the slave device (S31: No), the slave device determines whether the data matches reserved values (S32). The reserved values include, for example, the broadcast address SAb and the read request R illustrated in FIG. 13. If the data matches these reserved values (S32: Yes), the slave device outputs ACK (S33). On the other hand, if the data does not match the reserved values (S32: No), the generation of the internal clock signal sl-clk is stopped (S40).

After outputting ACK, the slave device transmits the read data Drd to make an address assignment request (S34) and compares the transmitted read data Drd with the data on the bus (S35). If a match is found (S35: Yes), the slave device transmits the subsequent read data (the subsequent 1 bit) (S34). On the other hand, if no match is found (S35: No), the slave device loses the arbitration, and the generation of the internal clock signal sl-clk is stopped (S40).

If not all the bits of the data have been transmitted (S36: No), the procedure described above is repeatedly performed until all the bits of the data have been transmitted. On the other hand, if all the bits of the data have been transmitted (S36: Yes), the slave device is determined to be a slave device that wins the arbitration, and receives a slave address transmitted from the master device (S37). Then, the slave device performs a parity check on the address. If the result of the parity check indicates that there is an error (S38: Yes), the generation of the internal clock signal sl-clk is stopped (S40). If the result of the parity check indicates that there is no error (S38: No), the slave device outputs ACK (S39).

Then, the slave device has been assigned an address and then stops the generation of the internal clock signal sl-clk (S40).

The operation flow illustrated in FIG. 14 is repeatedly performed until all the slave devices have been assigned addresses. For example, even a slave device that has lost the arbitration and that has stopped the internal clock signal sl-clk generates an internal clock signal again at the start of the next arbitration in response to the start repeat condition SR as a starting point, and can thus participate in the arbitration again.

With the clock stop condition described above, this embodiment can also reduce power consumption, compared to the configuration disclosed in Japanese Unexamined Patent Application Publication No. 2008-293230, and prevent the occurrence of unwanted radiation.

Clock Stop Condition 6

Figure 15:
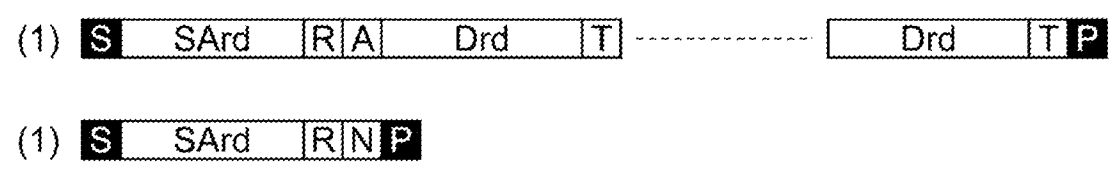

FIG. 15 is a diagram illustrating an example structure of data communicated by a data communication apparatus according to an embodiment of the present disclosure. Specifically, in FIG. 15, parts (1) and (2) depict data structures when a slave device makes an interrupt request. Part (1) depicts a data structure when the interrupt request is accepted, and part (2) depicts a data structure when the interrupt request is not accepted.

First, a slave device that makes an interrupt request transmits a slave address SArd thereof, and the master device receives the slave address SArd. Then, as depicted in part (1) in FIG. 15, when the master device accepts the interrupt request, ACK is outputted. In this case, the slave device for which an interrupt has been allowed transmits the read data Drd, and the stop condition P is reached when all the bits of the data have been transmitted. On the other hand, as depicted in part (2) in FIG. 15, when the master device does not accept the interrupt request, NACK is outputted, and the stop condition P is reached.

When a plurality of slave devices make an interrupt request, as in the dynamic address assignment described above, a slave device for which an interrupt is allowed is determined through arbitration.

Figure 16:
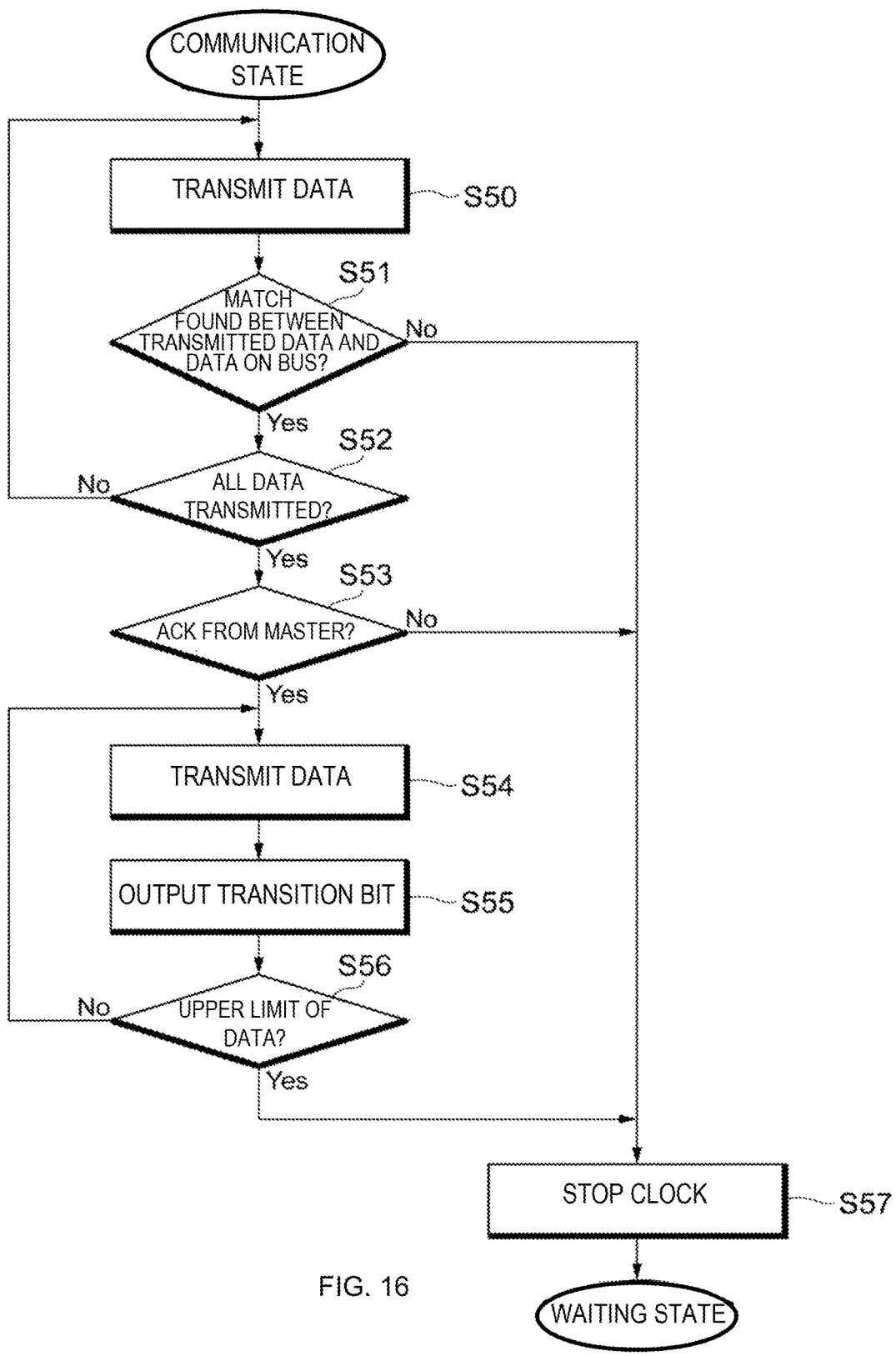
FIG. 16 is a flowchart when the data communication apparatus according to the embodiment of the present disclosure makes an interrupt request.

FIG. 16 is a flowchart when a data communication apparatus according to an embodiment of the present disclosure makes an interrupt request.

First, a slave device that makes an interrupt request transmits a slave address SArd assigned thereto (S50). As in the arbitration described above, the slave device determines whether a match is found between the transmitted data and data on the bus (S51). If a match is found (S51: Yes), the slave device continues transmission of the data (S50). On the other hand, if no match is found (S51: No), the generation of the internal clock signal sl-clk is stopped (S57).

If not all the bits of the data have been transmitted (S52: No), the procedure described above is repeatedly performed until all the bits of the data have been transmitted. On the other hand, if all the bits of the data have been transmitted (S52: Yes) and if ACK is transmitted from the master device (S53: Yes), the interrupt request is determined to be accepted and the slave device transmits the data (S54). Then, the slave device transmits a transition bit T for notifying the master device whether transmission ends (S55), and repeatedly performs data transmission until all the bits of the data have been transmitted. Even before the transmission of all the bits of the data is completed, if the amount of transmitted data exceeds a predetermined upper limit (S56: Yes), the generation of the internal clock signal sl-clk is stopped (S57).

On the other hand, if the master device does not transmit ACK (S53: No), the interrupt request is determined to be rejected and the generation of the internal clock signal sl-clk is stopped (S57).

With the clock stop condition described above, this embodiment can also reduce power consumption, compared to the configuration disclosed in Japanese Unexamined Patent Application Publication No. 2008-293230, and prevent the occurrence of unwanted radiation.

Clock Stop Condition 7

Figure 17:
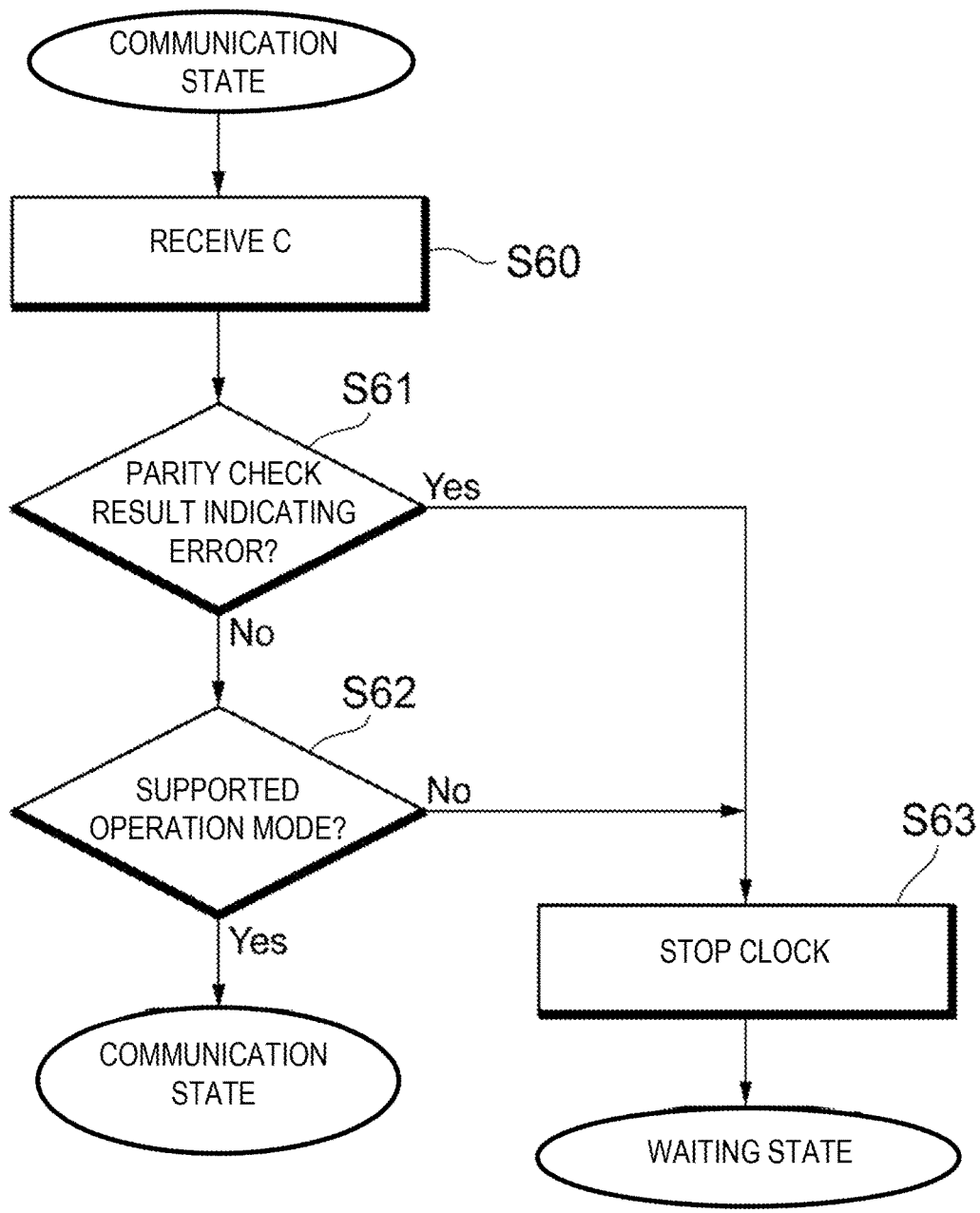
FIG. 17 is a flowchart when the data communication apparatus according to the embodiment of the present disclosure performs communication in an unsupported operation mode.

FIG. 17 is a flowchart when a data communication apparatus according to an embodiment of the present disclosure performs communication in an unsupported operation mode. The data structure is similar to that depicted in part (2) in FIG. 11, for example, and is not illustrated in the drawings.

First, a slave device receives a command C (S60). If the result of a parity check on the command C indicates that there is an error (S61: Yes), the generation of the internal clock signal sl-clk is stopped (S63).

On the other hand, if the result of the parity check indicates that there is no error (S61: No), the slave device determines whether the operation mode indicated by the command C is an operation mode supported by the slave device. If the operation mode is not supported by the slave device (S62: No), the internal clock signal sl-clk is unnecessary. Thus, the generation of the internal clock signal sl-clk is stopped (S63). On the other hand, if the operation mode is a supported operation mode (S62: Yes), the slave device continues communication.

With the clock stop condition described above, this embodiment can also reduce power consumption, compared to the configuration disclosed in Japanese Unexamined Patent Application Publication No. 2008-293230, and prevent the occurrence of unwanted radiation.

An exemplary embodiment of the present disclosure has been described. The data communication apparatus 100 is a data communication apparatus for performing communication of data with the master device 10 via the bus 30. The data communication apparatus 100 includes the clock control signal generation circuit 120 that outputs the clock control signal clk-en corresponding to the reset state of the data communication apparatus 100 and a communication state of the data communication apparatus 100, the communication start/end detection circuit 130 that detects a start of communication on the basis of the clock signal SCL on the bus and the data signal SDA, the clock generation circuit 110 that generates the internal clock signal sl-clk on the basis of the clock signal SCL on the bus, and the data processing control circuit 160 that is supplied with the internal clock signal sl-clk and controls communication of the data with the master device 10. The clock generation circuit 110 stops generating the internal clock signal sl-clk in accordance with the clock control signal clk-en, in the reset state of the data communication apparatus 100 and in a period from the release of the reset state to the start of communication. With this configuration, the data communication apparatus 100 can continuously stop generating the internal clock signal sl-clk from the start of the reset state until the next start condition S is satisfied. Thus, power consumption can be reduced, compared to the comparative example, and the occurrence of unwanted radiation can be prevented.

The data communication apparatus 100 further includes the reset circuit 140 that outputs the reset signal res for maintaining the reset state when the power supply voltage sl-VDD is less than a predetermined level. With this configuration, the clock control signal clk-en can be generated in accordance with the reset state of the data communication apparatus 100.

Further, when the data satisfies a clock stop condition for stopping the internal clock signal sl-clk, the data processing control circuit 160 generates the clock stop signal clk-stop and supplies the clock stop signal clk-stop to the clock control signal generation circuit 120. This configuration can stop the generation of the internal clock signal sl-clk under various clock stop conditions. Thus, the data communication apparatus 100 can reduce power consumption, compared to the comparative example, and can prevent the occurrence of unwanted radiation.

As a non-limiting example, the clock stop condition for stopping the internal clock signal sl-clk may include, for example, a condition in which the slave address SA included in the data has a predetermined error pattern.

The stop condition may include a condition in which a read or write data included in the data has a predetermined error pattern.

The clock stop condition may include a condition in which the amount of the data exceeds a predetermined level.

The stop condition may include a condition in which the command C included in the data has a predetermined error pattern.

The clock stop condition may include a condition in which, when the data communication apparatus 100 is dynamically assigned an address, the data communication apparatus 100 has lost arbitration with another data communication apparatus connected to the bus 30.

The clock stop condition may include a condition in which, when the data communication apparatus 100 is dynamically assigned an address, the address assigned to the data communication apparatus 100 has a predetermined error pattern.

The clock stop condition may include a condition in which, when the data communication apparatus 100 is dynamically assigned an address, the assignment of an address to the data communication apparatus 100 has been completed.

The clock stop condition may include a condition in which, when the data communication apparatus 100 makes an interrupt request, the data communication apparatus 100 has lost arbitration with another data communication apparatus connected to the bus 30.

The clock stop condition may include a condition in which, when the data communication apparatus 100 makes an interrupt request, the interrupt request has been rejected by the master device 10.

The clock stop condition may include a condition in which the data is communicated in an operation mode that is not supported by the data communication apparatus 100.

The embodiment described above is intended to help easily understand the present disclosure and is not to be used to construe the present disclosure in a limiting fashion. The present disclosure may be modified or improved without departing from the gist thereof, and equivalents of such modifications or improvements are also included in the present disclosure. That is, the embodiment may be appropriately modified in design by those skilled in the art, and such modifications also fall within the scope of the present disclosure so long as the modifications include the features of the present disclosure. For example, elements included in the embodiment and the arrangements, materials, conditions, shapes, sizes, and so on thereof are not limited to those illustrated exemplarily but can be modified as appropriate. Elements included in the embodiment can be combined as much as technically possible, and such combinations of elements also fall within the scope of the present disclosure so long as the combinations of elements include the features of the present disclosure.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A data communication apparatus configured to perform data communication with a master device via a bus, the data communication apparatus comprising:
   a clock control signal generation circuit configured to output a clock control signal corresponding to a reset state of the data communication apparatus and a communication state of the data communication apparatus;
   a reset circuit configured to output a reset signal for maintaining the reset state when a power supply voltage is less than a predetermined level;
   a communication start detection circuit configured to detect a start of communication based on a clock signal on the bus and communicated data;
   a clock generation circuit configured to generate an internal clock signal based on the clock signal on the bus; and
   a data processing control circuit that is supplied with the internal clock signal and that is configured to control data communication with the master device,
   wherein the clock generation circuit is configured to stop generating the internal clock signal in accordance with the clock control signal while the data communication apparatus is in the reset state and between an end of the reset state and a start of data communication.

2. A data communication apparatus configured to perform data communication with a master device via a bus, the data communication apparatus comprising:
   a clock control signal generation circuit configured to output a clock control signal corresponding to a reset state of the data communication apparatus and a communication state of the data communication apparatus;
   a communication start detection circuit configured to detect a start of communication based on a clock signal on the bus and communicated data;
   a clock generation circuit configured to generate an internal clock signal based on the clock signal on the bus; and
   a data processing control circuit that is supplied with the internal clock signal and that is configured to control data communication with the master device,
   wherein the clock generation circuit is configured to stop generating the internal clock signal in accordance with the clock control signal while the data communication apparatus is in the reset state and between an end of the reset state and a start of data communication, and wherein when the communicated data satisfies a stop condition for stopping the internal clock signal, the data processing control circuit is configured to generate a stop signal and supply the stop signal to the clock control signal generation circuit.

3. The data communication apparatus according to claim 2, wherein the stop condition is satisfied when a slave address included in the communicated data has a predetermined error pattern.

4. The data communication apparatus according to claim 2, wherein the stop condition is satisfied when read or write data included in the communicated data has a predetermined error pattern.

5. The data communication apparatus according to claim 2, wherein the stop condition is satisfied when an amount of the communicated data exceeds a predetermined level.

6. The data communication apparatus according to claim 2, wherein the stop condition is satisfied when a command included in the communicated data has a predetermined error pattern.

7. The data communication apparatus according to claim 2, wherein, when the data communication apparatus is dynamically assigned an address, the stop condition is satisfied when the data communication apparatus loses arbitration with another data communication apparatus connected to the bus.

8. The data communication apparatus according to claim 2, wherein, when the data communication apparatus is dynamically assigned an address, the stop condition is satisfied when the address assigned to the data communication apparatus has a predetermined error pattern.

9. The data communication apparatus according to claim 2, wherein, when the data communication apparatus is dynamically assigned an address, the stop condition is satisfied when assignment of the address to the data communication apparatus is completed.

10. The data communication apparatus according to claim 2, wherein, when the data communication apparatus makes an interrupt request, the stop condition is satisfied when the data communication apparatus loses arbitration with another data communication apparatus connected to the bus.

11. The data communication apparatus according to claim 2, wherein, when the data communication apparatus makes an interrupt request, the stop condition is satisfied when the interrupt request is rejected by the master device.

12. The data communication apparatus according to claim 2, wherein the stop condition is satisfied when the communicated data is communicated in an operation mode that is not supported by the data communication apparatus.

* * * * *